United States Patent [19]

Laran

[11] Patent Number: 4,489,051
[45] Date of Patent: Dec. 18, 1984

[54] SYNTHESIS OF COMPLEX BERYLLIUM HYDRIDES

[75] Inventor: Roy J. Laran, Greenwell Springs, La.

[73] Assignee: Ethyl Corporation, Richmond, Va.

[21] Appl. No.: 573,005

[22] Filed: Jan. 23, 1984

[51] Int. Cl.³ ............................................. C01B 6/24
[52] U.S. Cl. .................................................. 423/644
[58] Field of Search ....................................... 423/644

[56] References Cited

U.S. PATENT DOCUMENTS 3,383,187  5/1968  Price et al. ........................... 423/644
3,647,399  3/1972  Ashley et al. ........................ 423/644

*Primary Examiner*—Herbert T. Carter
*Attorney, Agent, or Firm*—Donald L. Johnson; John F. Sieberth

[57] ABSTRACT

Alkali metal beryllium tetrahydride is produced by heating a mixture of beryllium hydride and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, the mixture having a $BeH_2$: $MAlR_mH_n$ mole ratio above 1:1 (preferably at least about 1.5:1) to a temperature at which alkali metal beryllium tetrahydride of the formula $M_2BeH_4$ is produced.

19 Claims, No Drawings

SYNTHESIS OF COMPLEX BERYLLIUM HYDRIDES

This invention relates to a novel process for the synthesis of alkali metal beryllium tetrahydrides, such as dilithium beryllium tetrahydride, disodium beryllium tetrahydride, and the like.

U.S. Pat. No. 3,647,399 to Ashby and Kobetz describes the first successful synthesis of the alkali metal beryllium tetrahydrides. The process they employed involves the reaction of a beryllium dialkyl, $BeR_2$ (R=alkyl of 1 to 10 carbon atoms), with a compound of the formula $MAlR_3H$, $MAlR_2H_2$, or a mixture of both such compounds (M=alkali metal).

In accordance with this invention alkali metal beryllium tetrahydride is produced by heating a mixture of beryllium hydride and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, said mixture having a $BeH_2:MAlR_mH_n$ mole ratio above 1:1 (preferably at least about 1.5:1) to an elevated temperature at which alkali metal beryllium tetrahydride of the formula $M_2BeH_4$ is produced.

If desired, the reaction may be conducted under a hydrogen atmosphere.

The alkali metal aluminum complexes useful in the process comprise the alkali metal aluminum hydrocarbyl trihydrides, $MAlRH_3$; the alkali metal aluminum dihydrocarbyl dihydrides, $MAlR_2H_2$; the alkali metal aluminum trihydrocarbyl hydrides, $MAlR_3H$; the alkali metal aluminum tetrahydrocarbyls, $MAlR_4$; and mixtures of any two or three or all four of these. The hydrocarbyl groups, R, may contain any suitable number of carbon atoms and may be aliphatic, cycloaliphatic, and/or aromatic. R may also be any suitably inert heterocyclic group, (groups in which the hetero atom(s) may be nitrogen, oxygen, etc.) or R may be any other inert substituted or unsubstituted cyclic or acyclic organic group which does not interfere with the desired reaction.

Exemplary hydrocarbyl compounds of this type include lithium aluminum ethyl trihydride, sodium aluminum butyl trihydride, potassium aluminum methyl trihydride, lithium aluminum phenyl trihydride, sodium aluminum cyclohexyl trihydride, sodium aluminum benzyl trihydride, potassium aluminum octadecyl trihydride, lithium aluminum phenethyl trihydride, lithium aluminum dimethyl dihydride, sodium aluminum dipentyl dihydride, potassium aluminum diethyl dihydride, sodium aluminum bis(p-tolyl)dihydride, sodium aluminum bis(cyclopentyl)dihydride, sodium aluminum dibenzyl dihydride, potassium aluminum bis(hexadecyl)dihydride, lithium aluminum bis(phenethyl)dihydride, lithium aluminum ethyl methyl dihydride, lithium aluminum trimethyl hydride, sodium aluminum tripropyl hydride, potassium aluminum triethyl hydride, sodium aluminum tris(p-ethylphenyl)hydride, sodium aluminum bis(cyclopentyl)ethyl hydride, sodium aluminum tribenzyl hydride, potassium aluminum tris(tetradecyl)hydride, lithium aluminum tris(cyclopropylcarbinyl)hydride, lithium aluminum tetraethyl, lithium aluminum tetrabutyl, sodium aluminum tetrabutyl, potassium aluminum tetramethyl, lithium aluminum tetraphenyl, sodium aluminum tetracyclohexyl, sodium aluminum dibenzyl dimethyl, potassium aluminum tetraoctadecyl, lithium aluminum phenethyl triethyl, and the like. Sodium aluminum tetraethyl and equivalent sodium aluminum tetraalkyls, as well as their lithium counterparts are the preferred reactants.

The relative proportions between the beryllium hydride and the alkali metal aluminum complex are important. As noted above, the reaction system should contain more than one mole of beryllium hydride per mole of the alkali metal complex. For best results it is preferred to employ at least 1.5 gram moles of beryllium hydride per gram mole of the alkali metal aluminum complex used. The upper limit on this ratio does not appear critical and thus is governed mainly by convenience and materials handling considerations.

The reaction is conducted in an anhydrous environment, preferably under an atmosphere composed essentially entirely of dry hydrogen or an inert gas such as argon, neon, nitrogen, or the like. Mixtures of hydrogen and other suitable gaseous materials, such as nitrogen, argon, etc., may be used if desired. Temperatures in the range of about 100° to about 350° C., and preferably in the range of about 125° to about 275° C., may be used. On the basis of available information, there is nothing critical about the temperature conditions provided of course that in any given case the temperature conditions selected result in the formation of the desired alkali metal beryllium tetrahydride and do not cause its decomposition.

The reaction may be and preferably is conducted in bulk (i.e., no diluent is introduced into the reaction system). However it is possible to carry out the reaction in a suitable innocuous liquid diluent such as a hydrocarbon. Alkanes, cycloalkanes and aromatics are desirable materials for this use. When using a diluent, the reaction mixture should be subjected to agitation to insure intimate contact between the reactants.

By way of example, reactions were conducted in glass reactors using beryllium hydride in molten sodium aluminum tetraethyl. In one case the mole ratio of $BeH_2:NaAlEt_4$ was 1.5:1 in accordance with the proposed equation:

$$2NaAlEt_4 + 3BeH_2 \rightarrow Na_2BeH_4 + 2Et_3Al.EtBeH$$

In another case the mole ratio of these reactants was 1:1 according to the proposed equation:

$$NaAlEt_4 + BeH_2 \rightarrow NaAlEt_3H.EtBeH$$

In the first case (1.5:1 ratio) X-ray analysis of the reaction product showed the presence of $Na_2BeH_4$. In contrast, the ether-insoluble product from the 1:1 mole ratio reaction did not result in a significant increase in weight corresponding to $Na_2BeH_4$, and analysis of the ether filtrate gave a Al/Be ratio of nearly 2/1.

The alkali metal beryllium tetrahydrides are useful as portable sources of hydrogen gas and as reducing agents in a variety of chemical synthesis reactions. Other known uses for the materials are referred to in U.S. Pat. No. 3,647,399 to Ashby and Kobetz, the disclosure of which is incorporated herein.

This invention is susceptible to considerable variation in its practice in accordance with the true spirit and scope of the ensuing claims.

What is claimed is:

1. A process which comprises heating a mixture of beryllium hydride and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, said mixture having a $BeH_2:MAlR_mH_n$ mole ratio above 1:1, to an elevated temperature at which alkali metal beryllium tetrahydride of the formula $M_2BeH_4$ is produced so that alkali metal beryllium tetrahydride of the formula $M_2BeH_4$ is produced.

2. The process of claim 1 wherein m is 4 and n is 0.
3. The process of claim 1 wherein M is lithium.
4. The process of claim 1 wherein M is sodium.
5. The process of claim 1 wherein m is 4, n is 0 and M is lithium.
6. The process of claim 1 wherein m is 4, n is 0 and M is sodium.
7. A process which comprises heating a mixture of beryllium hydride and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, said mixture having a $BeH_2:MAlR_mH_n$ mole ratio of at least about 1.5:1, to an elevated temperature at which alkali metal beryllium tetrahydride of the formula $M_2BeH_4$ is produced so that alkali metal beryllium tetrahydride of the formula $M_2BeH_4$ is produced.

8. The process of claim 7 wherein m is 4 and n is 0.
9. The process of claim 7 wherein M is lithium.
10. The process of claim 7 wherein M is sodium.
11. The process of claim 7 wherein m is 4, n is 0 and M is lithium.
12. The process of claim 7 wherein m is 4, n is 0 and M is sodium.
13. A process which comprises reacting beryllium hydride in admixture with molten alkali metal aluminum complex of the formula $$MAlR_4$$

wherein M is an alkali metal and R is a hydrocarbyl group, the $BeH_2:MAlR_4$ mole ratio being at least about 1.5:1, so that alkali metal beryllium tetrahydride of the formula $M_2BeH_4$ is produced.

14. The process of claim 13 wherein M is lithium.
15. The process of claim 13 wherein M is sodium.
16. The process of claim 13 wherein R is an alkyl group.
17. The process of claim 13 wherein said complex is a lithium aluminum tetraalkyl.
18. The process of claim 13 wherein said complex is a sodium aluminum tetraalkyl.
19. The process of claim 13 wherein said complex is sodium aluminum tetraethyl.

* * * * *